(12) United States Patent
Park et al.

(10) Patent No.: US 9,180,727 B2
(45) Date of Patent: Nov. 10, 2015

(54) DECORATION SHEET WITH HIGH WEATHER RESISTANCE AND HAIR LINE

(75) Inventors: Jiyong Park, Ulsan (KR); Donggon Kim, Ulsan (KR); Jungeun Ha, Gyeongsangnam (KR)

(73) Assignee: LG Hausys, Ltd., Seoul (KR)

( * ) Notice: Subject to any disclaimer, the term of this patent is extended or adjusted under 35 U.S.C. 154(b) by 0 days.

(21) Appl. No.: 13/503,820

(22) PCT Filed: Dec. 7, 2010

(86) PCT No.: PCT/KR2010/008707
§ 371 (c)(1),
(2), (4) Date: Apr. 24, 2012

(87) PCT Pub. No.: WO2011/074820
PCT Pub. Date: Jun. 23, 2011

(65) Prior Publication Data
US 2012/0213981 A1  Aug. 23, 2012

(30) Foreign Application Priority Data
Dec. 17, 2009  (KR) .................. 10-2009-0125953

(51) Int. Cl.
*B44C 1/10* (2006.01)
*B44C 5/00* (2006.01)
(Continued)

(52) U.S. Cl.
CPC ........... *B44C 1/105* (2013.01); *B29L 2009/003* (2013.01); *B32B 15/08* (2013.01);
(Continued)

(58) Field of Classification Search
CPC ........ B32B 15/08; B32B 27/08; B32B 27/30; B32B 15/20; B32B 2311/00; B32B 2451/00; B29C 45/14; B29C 2791/00; B29C 2791/001; B29C 2745/14811; B44C 1/005; B44C 3/085; B44C 5/04; B29L 2009/00; B29L 2009/003; B29L 2031/722; B29K 2705/00; G03H 2001/0284
USPC ........ 156/230, 247; 428/195.1, 201, 327, 354
See application file for complete search history.

(56) References Cited

U.S. PATENT DOCUMENTS 4,133,913 A * 1/1979 Moore .......................... 427/140
6,544,369 B1 * 4/2003 Kitamura et al. ............. 156/230

FOREIGN PATENT DOCUMENTS

JP  1988-037953  2/1988
JP  1998-071677  3/1998
(Continued)

OTHER PUBLICATIONS

JP 2005-246891 Machine Translation via AIPN Website tranlation tool.*
(Continued)

*Primary Examiner* — Mark Ruthkosky
*Assistant Examiner* — Laura C Powers
(74) *Attorney, Agent, or Firm* — Dentons US LLP

(57) ABSTRACT

Provided is a decoration sheet with high weather resistance and hair line, and a manufacturing method thereof. The decoration sheet with weather resistance and hair line, which is attached to a surface of an object so as to protect the object from external environment, includes a PVC layer of which a lower surface is attached to the object; a hair line printing layer formed with a lower surface contacted with an upper surface of the PVC and an upper surface on which the hair line is formed, and formed of a mixture of aluminum and acryl; and an acrylic layer formed with a lower surface contacted with an upper surface of the hair line printing layer and an upper surface exposed to the external environment.

3 Claims, 1 Drawing Sheet

(51) Int. Cl.
  *B32B 15/08* (2006.01)
  *B32B 15/20* (2006.01)
  *B32B 27/08* (2006.01)
  *B32B 27/30* (2006.01)
  *B32B 38/06* (2006.01)
  *B29L 9/00* (2006.01)

(52) U.S. Cl.
  CPC ............... *B32B 15/20* (2013.01); *B32B 27/08* (2013.01); *B32B 27/30* (2013.01); *B32B 38/06* (2013.01); *B44C 5/00* (2013.01); *Y10T 428/24851* (2015.01)

(56) References Cited

FOREIGN PATENT DOCUMENTS

| | | |
|---|---|---|
| JP | 11-020078 A | 1/1999 |
| JP | 11-105206 A | 4/1999 |
| JP | 2000-211070 A | 8/2000 |
| JP | 2002-210877 A | 7/2002 |
| JP | 2004-142439 | 5/2004 |
| JP | 2005-096266 | 4/2005 |
| JP | 2005-246891 | 9/2005 |
| KR | 10-2006-0012072 A | 2/2006 |
| KR | 10-0816300 B1 | 3/2008 |
| KR | 10-2008-0066272 A | 7/2008 |
| KR | 10-2009-0030932 A | 3/2009 |
| KR | 1020100047382 A | 5/2010 |
| WO | 2010/008225 A2 | 1/2010 |

OTHER PUBLICATIONS

JP 10-071677 Machine Translation via AIPN Website tranlation tool.*

JP 2004-142439 Machine Translation via AIPN Website tranlation tool.*

* cited by examiner

S110

S120

S130

S140

DECORATION SHEET WITH HIGH WEATHER RESISTANCE AND HAIR LINE

This application is a National Stage Entry of International Application No. PCT/KR2010/008707, filed Dec. 7, 2010, and claims the benefit of Korean Application No. 10-2009-0125953, filed on Dec. 17, 2009, which is hereby incorporated by reference for all purposes as if fully set forth herein.

TECHNICAL FIELD

The present invention relates to a decoration sheet attached to an object, and particularly to a decoration sheet with high weather resistance and hair line, which has the weather resistance protecting the object from the external environment such as ultraviolet ray and moisture, and the hair line providing an effect of metallic feeling. Further, the present invention relates to a manufacturing method thereof.

BACKGROUND ART

Generally, a building has a window system for both lighting and ventilating purposes. The window system includes a window sash which is directly installed at the building, and a window which is coupled to the window sash in a hinged or sliding manner. The window includes a frame which is coupled to the window sash, and a glass plate which is fixed to the frame.

Typically, a decoration sheet with high weather resistance is attached to outer surfaces of the window sash and frame which are exposed outside the building. Because the decoration sheet functions to protect the window sash and frame from the external environment such as ultraviolet ray and moisture, it has high weather resistance against the ultraviolet ray, moisture and the like.

Meanwhile, in order to provide an esthetic appearance of the window sash and frame, the decoration sheet having an effect of metallic feeling is recently required by the market. For this end, there have been provided a decoration sheet in which hair line is formed on a PVC sheet and a decoration sheet in which hair line is formed on a PET sheet. In case of the former, there are limitations in providing the effect of metallic feeling, and in case of latter, the weather resistance of PET is too low, and thus it is improper as the decoration sheet with the weather resistance.

In Japanese Patent Laid-Open No. 2004-142439, there is disclosed a metallic luster sheet having metallic feeling as well as weather resistance. The metallic luster sheet includes a base sheet which is contacted with an object, a fine unevenness layer stacked on an upper surface of the base sheet, and a protecting sheet stacked on an upper surface of the fine unevenness layer. The base sheet is formed of acryl, PVC, PET and so on, the metallic luster sheet is formed of aluminum, nickel, chrome and the like, the fine unevenness layer is formed of acryl, PVC and the like, and the protecting sheet is formed of acryl and the like.

The metallic luster sheet includes a metallic luster layer formed of a metallic material, and the hair line is formed at the metallic luster layer so as to provide the effect of metallic feeling. Further, the base sheet and the protecting sheet are provided on both upper and lower surfaces of the metallic luster layer so as to provide the high weather resistance.

However, in the metallic luster sheet as described above, the hair line is formed on the metallic luster layer formed of aluminum, nickel, chrome and the like through the fine unevenness layer. Therefore, in the metallic luster sheet, there is a problem in that the fine unevenness layer has to be necessarily provided between the metallic luster layer and the protecting layer.

Furthermore, in the metallic luster sheet as described above, since the metallic luster layer formed of the metallic material is contacted with the fine unevenness layer and base sheet which are formed of a polymer resin, there is another problem in that adhesive strength between the metallic luster layer and the fine unevenness layer and between the metallic luster layer and the base sheet is not ensured sufficiently.

DISCLOSURE OF INVENTION

Technical Problem

An embodiment of the present invention is directed to providing a decoration sheet with high weather resistance and hair line, which can be manufactured to have a simple structure and also can enhance the adhesive strength between a metallic sheet and a non-metallic sheet adjacent to the metallic sheet.

Another embodiment of the present invention is directed to providing a manufacturing method of the decoration sheet with high weather resistance and hair line.

Solution to Problem

To achieve the object of the present invention, the present invention provides a decoration sheet with weather resistance and hair line, which is attached to a surface of an object so as to protect the object from external environment, including a PVC layer of which a lower surface is attached to the object; a hair line printing layer formed with a lower surface contacted with an upper surface of the PVC and an upper surface on which the hair line is formed, and formed of a mixture of aluminum and acryl; and an acrylic layer formed with a lower surface contacted with an upper surface of the hair line printing layer and an upper surface exposed to the external environment.

Preferably, the hair line printing layer has a thickness of 3~10μ.

Further, the present invention provides a manufacturing method of a decoration sheet with weather resistance and hair line, which is attached to a surface of an object so as to protect the object from external environment, including forming the hair line at a surface of a transfer film; coating a coating liquid, in which liquid aluminum and acrylic medium are mixed, on the surface of the transfer film on which the hair line is formed, and then hardening the coating liquid; thermally transferring the transfer film onto a PVC sheet so as to contact the hardened coating liquid and the PVC sheet, and then removing the transfer film; and stacking an acrylic film on a surface of the hardened coating liquid.

Preferably, in the coating of the coating liquid on the surface of the transfer film, the coating liquid has a thickness of 3~10μ.

Preferably, in the thermally transferring of the transfer film onto a PVC sheet, the transfer film is thermally transferred onto the PVC sheet at a temperature of 110~170° C.

Preferably, a content of the acrylic medium is within an extent of 75~98% based on the whole weight.

DETAILED DESCRIPTION OF MAIN ELEMENTS

Figure 1:
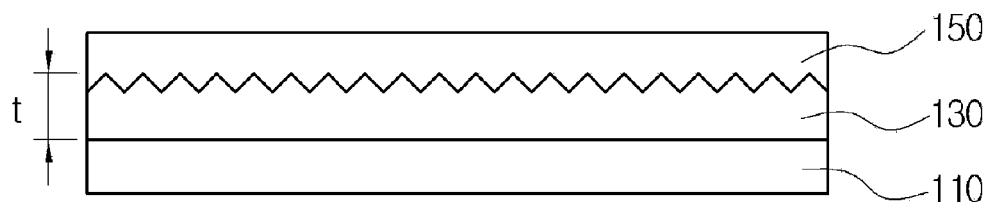
FIG. 1 is a cross-sectional view of a decoration sheet with high weather resistance and hair line according to the present invention.

100: decoration sheet 110: PVC layer
130: hair line printing layer 150: acrylic layer
210: transfer film 220: coating liquid
230: PVC sheet 240: acrylic film

MODE FOR THE INVENTION

The advantages, features and aspects of the invention will become apparent from the following description of the embodiments with reference to the accompanying drawings, which is set forth hereinafter. The terms and words used in the description as described below are not limited to the typical or dictionary definition, and they can be interpreted as proper meanings and definitions consistent with the technical ideas.

Figure 2:
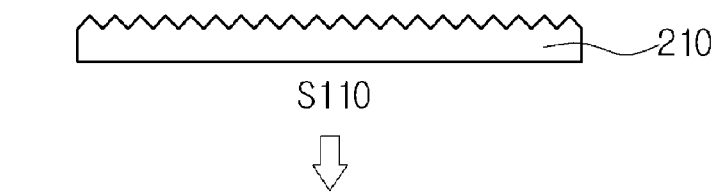
FIG. 2 is a schematic view showing a manufacturing process of the decoration sheet of FIG. 1.
Figure 2:
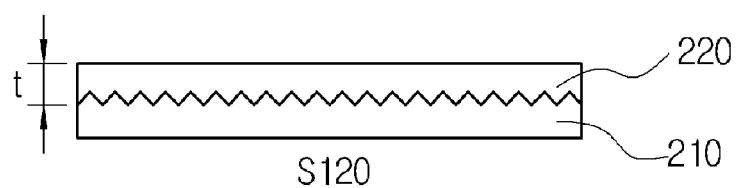
Figure 2:
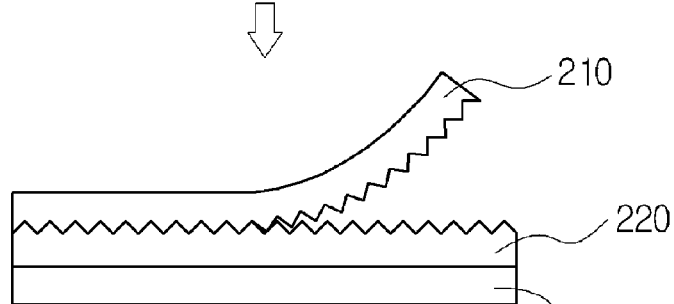
Figure 2:
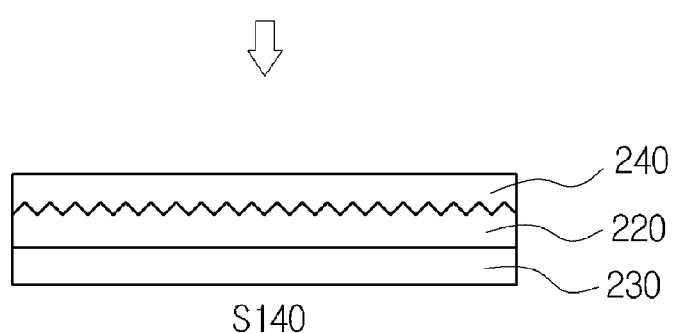

FIG. 1 is a cross-sectional view of a decoration sheet with high weather resistance and hair line according to the present invention, and FIG. 2 is a schematic view showing a manufacturing process of the decoration sheet of FIG. 1.

A decoration sheet 100 with high weather resistance and hair line according to the present invention is attached to a surface of an object such as a window sash and a frame of a window in order to protect the object from the external environment such as ultraviolet ray and moisture. As shown in FIG. 1, the decoration sheet 100 with high weather resistance and hair line includes a PVC layer 110, a hair line printing layer 130 and an acrylic layer 150.

The PVC layer 110 is the lowermost layer of the decoration sheet 100, and a lower surface of the PVC layer 110 is attached to the object. Further, the PVC layer 110 is made of PVC in order to ensure the weather resistance.

The hair line printing layer 130 is stacked on the PVC layer 110. A lower surface of the hair line printing layer 130 is contacted with an upper surface of the PVC layer 110, and the hair line is formed at an upper surface of the hair line printing layer 130. The hair line printing layer 130 is formed of a mixture of aluminum and acryl.

In case that the hair line printing layer 130 contains aluminum and the hair line is formed at the upper surface of the hair line printing layer 130, the decoration sheet 100 may have an effect of metallic feeling. Further, since aluminum is cheaper than other metallic materials, the decoration sheet 100 may be manufactured at low cost, if the hair line printing layer 130 is formed of aluminum.

If the hair line printing layer 130 is formed of only aluminum, the weather resistance of the hair line printing layer 130 is deteriorated. And, the adhesive strength between the hair line printing layer 130 of the metallic material and the PVC layer 110 of the non-metallic material and between the hair line printing layer 130 of the metallic material and the acrylic layer 150 of the non-metallic material is also deteriorated. Therefore, the acryl is used together with the aluminum as the material forming the hair line printing layer 130. Since the acryl has the high weather resistance, if acryl is contained in the material forming the hair line printing layer 130, the hair line printing layer 130 can have the weather resistance as well as the effect of metallic feeling. Further, since the acryl is non-metallic material, if the acryl is contained in the material forming the hair line printing layer 130, it is possible to ensure the adhesive strength between the hair line printing layer 130 and the PVC layer 110 and between the hair line printing layer 130 and the acrylic layer 150.

Preferably, the hair line printing layer 130 has a thickness of 3-10 μm. If the thickness of hair line printing layer 130 is less than the minimum value, it is difficult to form the hair line printing layer 130, and if the thickness thereof is larger than the maximum value, the material thereof is wasted.

The acrylic layer 150 is the uppermost layer of the decoration sheet 100. A lower surface of the acrylic layer 150 is contacted with the upper surface of the hair line printing layer 130, and an upper surface thereof is exposed to the external environment. Further, the acrylic layer 150 is formed of the acryl in order to ensure the weather resistance.

Hereinafter, a manufacturing method of the decoration sheet 100 will be described with reference to FIG. 2.

The manufacturing method of the decoration sheet 100 with high weather resistance and hair line includes first to fourth steps (S110 to S140).

In the first step S110, the hair line is formed on a surface of a transfer film 210. The transfer film 210 is formed of a material, which can facilely form the hair line, for example, PET (Polyethylene Terephthalate).

In the second step S120, coating liquid 220 in which liquid aluminum and acrylic medium are mixed is coated on the surface of the transfer film 210 on which the hair line is formed, and then the coating liquid 220 is hardened. The acrylic medium is a liquid material in which acryl and a solvent are mixed. The solvent is evaporated when the coating liquid 220 is hardened. Therefore, the hardened coating liquid 220 contains only the aluminum and acryl.

The acrylic medium ensures excellent adhesive strength between the hardened coating liquid 220 and the non-metallic material (PVC sheet 230 and acrylic film 240) contacted with the hardened coating liquid 220. As the content of the acrylic medium is increased, the adhesive strength is enhanced. But if the content of the acrylic medium is too high, the effect of hair line is reduced. Therefore, it is preferable that the content of the acrylic medium is within an extent of 75~98% based on the whole weight.

Meanwhile, if a thickness of the coating liquid 220 is too thin, the hardened coating liquid 220 may be damaged when the transfer film 210 is removed in the third step S130. And if the thickness is too thick, the material thereof is wasted. Preferably, the thickness of the coating liquid 220 is within an extent of 3~10 μm.

In the third step, the transfer film 210 is removed after being thermally transferred onto the PVC sheet 230 so as to contact the hardened coating liquid 220 and the PVC sheet 230. If the third step is performed, the hardened coating liquid 220 is stacked on the PVC sheet 230, and the hair line is formed at the upper surface of the coating liquid 220. Meanwhile, in order to ensure the adhesive strength between the PVC sheet 230 and the hardened coating liquid 220 and also prevent the hardened coating liquid 220 from being melted, it is preferable that the thermal transfer is performed at a temperature of 110~170° C.

In the fourth step S140, an acrylic film 240 is stacked on an upper surface of the hardened coating liquid 220. The stacking of the acrylic film 240 is carried out by heat treatment.

The decoration sheet manufactured through the above-mentioned processes includes the PVC sheet 230, the coating liquid 220 stacked on the PVC sheet 230, and the acrylic film 240 stacked on the coating liquid 220. The PVC sheet 230 forms the PVC layer 110, the hardened coating liquid 220 forms the hair line printing layer 130, and the acrylic film 240 forms the acrylic layer 150.

It is difficult to form the hair line at a metallic material like aluminum. However, in case of using the manufacturing method as described above, it is facile to form the hair line at the metallic material like aluminum.

According to the present invention, since it is possible to form the hair line at one surface of the hair line printing layer without any auxiliary layers, the decoration sheet may have a simple construction.

Further, since the hair line printing layer is formed of the mixture of the aluminum and the acryl, it is possible to provide the excellent adhesive strength between the hair line printing layer and the adjacent non-metallic layers.

Further, since the hair line printing layer ensures the weather resistance, and the acrylic layer and PVC layer also have the weather resistance, the decoration sheet has the high weather resistance.

Furthermore, according to the present invention, it is possible to facilely form the hair line at the metallic material like aluminum.

While the present invention has been described with respect to the specific embodiments, it will be apparent to those skilled in the art that various changes and modifications may be made without departing from the spirit and scope of the invention as defined in the following claims.

The invention claimed is:

1. A decoration sheet comprising:
   a PVC sheet;
   a hair line printing layer provided with an upper surface on which a hair line is formed and a lower surface on which the hair line is not formed, wherein the lower surface is attached to the PVC sheet; and
   an acrylic film attached to the upper surface of the hair line printing layer,
   wherein the hair line printing layer is a hardened coating liquid comprising a mixture of a liquid aluminum and an acrylic medium,
   wherein the hair line printing layer has a thickness of 3-10 μm, and
   wherein the acrylic medium is included in an amount of 75-98% by weight based on the total weight of the coating liquid.

2. A manufacturing method of a decoration sheet with weather resistance and hair line, which is attached to a surface of an object so as to protect the object from external environment, comprising:
   forming the hair line at a surface of a transfer film;
   coating a coating liquid, in which liquid aluminum and acrylic medium are mixed, on the surface of the transfer film on which the hair line is formed, and then hardening the coating liquid;
   thermally transferring the transfer film onto a PVC sheet so as to contact the hardened coating liquid and the PVC sheet, and then removing the transfer film; and
   stacking an acrylic film on a surface of the hardened coating liquid,
   wherein, in the coating of the coating liquid on the surface of the transfer film, the coating liquid has a thickness of 3-10 μm, and
   wherein the acrylic medium is included in an amount of 75-98% by weight based on the total weight of the coating liquid.

3. The manufacturing method of claim 2, wherein, in the thermally transferring of the transfer film onto a PVC sheet, the transfer film is thermally transferred onto the PVC sheet at a temperature of 110~170° C.

* * * * *